United States Patent
Chen et al.

(10) Patent No.: US 9,438,055 B2
(45) Date of Patent: Sep. 6, 2016

(54) METHOD FOR CHARGING A POWER DEVICE OF A PORTABLE DEVICE USING A CURRENT-ADAPTIVE PROCESS

(71) Applicant: Simplo Technology Co., Ltd., Hsinchu County (TW)

(72) Inventors: Tai-Hung Chen, Hsinchu County (TW); Shih-Chou Chen, Taoyuan County (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 157 days.

(21) Appl. No.: 14/472,389

(22) Filed: Aug. 29, 2014

(65) Prior Publication Data

US 2015/0137769 A1    May 21, 2015

(30) Foreign Application Priority Data

Nov. 18, 2013   (TW) .............................. 102141901 A

(51) Int. Cl.
| | |
|---|---|
| H02J 7/04 | (2006.01) |
| H02J 7/06 | (2006.01) |
| H02J 7/16 | (2006.01) |
| H02J 7/00 | (2006.01) |

(52) U.S. Cl.
CPC .............. *H02J 7/0052* (2013.01); *H02J 7/007* (2013.01); *Y02B 40/90* (2013.01)

(58) Field of Classification Search
CPC ....................................................... H02J 7/0052
USPC ................................................. 320/162–164
See application file for complete search history.

(56) References Cited

U.S. PATENT DOCUMENTS

| | | | | |
|---|---|---|---|---|
| 7,656,132 B2* | 2/2010 | So | .......................... | H01M 10/44 320/134 |
| 7,872,450 B1* | 1/2011 | Cohen | ................... | H02J 7/0068 320/134 |
| 2008/0315845 A1 | 12/2008 | Van Der Velden | | |
| 2013/0257356 A1 | 10/2013 | Tang et al. | | |

FOREIGN PATENT DOCUMENTS

CN        103368210 A     10/2013

\* cited by examiner

*Primary Examiner* — Richard V Muralidar
(74) *Attorney, Agent, or Firm* — Winston Hsu; Scott Margo

(57) ABSTRACT

In the charging process of a power device of a portable device, a control unit or firmware of the power device dynamically acquires the status of the charging current and the charging voltage, and by incrementing the charging current, the power device correctly obtains maximum charging current affordable by a charger without overly drawing the current from the charger that causes overly low charging voltage. Such current-adaptive charging process optimizes the charging process.

10 Claims, 3 Drawing Sheets

METHOD FOR CHARGING A POWER DEVICE OF A PORTABLE DEVICE USING A CURRENT-ADAPTIVE PROCESS

BACKGROUND OF THE INVENTION

1. Field of the Invention

The invention relates to a charging control method, and more particularly, to a method for charging a power device of a portable device using a current-adaptive process according to the capability of a charger.

2. Description of the Prior Art

Portable devices like tablet computers, mobile phones, or power banks, are charged commonly in constant voltage and constant current. With the increase of battery capacity of portable devices, the bundled charger also has larger specified charging current. It is very common to have many chargers in hand, some with large specified current like 1500 mA, 2000 mA or even more, and others with small specified current like 1000 mA or less. Besides charging the corresponding tablet computer or mobile phone, people can pick one charger and connect it to other portable devices for charging the device, thanks to the fact that these chargers may share the same connector specification.

It is also a known fact that the power device of each different portable device should be charged with no more than its acceptable maximum charging current and each charger also has its capability to provide some maximum charging current. When the power device is being charged, it draws as much current as it can take from the charger to the limit the charger can provide and when the charger is capable of affording a maximum charging current that is no less than what the power device can take, the charger is quite qualified to charge the power device via the maximum charging current the power device can accept. However, if the charger can provide no more than what the power device can take, i.e., the power device is being charged by the charger with insufficient specified current output (for example, the power device may be charged with as much as 2 A while the charger can only afford a charging current up to 1 A), it maybe the case that the power device will continuously try to draw current higher than what the charger can afford from the charger. This may cause the charger to activate a protection mechanism to stop providing power intermittently. Under some circumstances, the charger may even be force to provide too much current beyond its designed capability for the power device, and it should do harm to the charger in the long run, since excessive current provision by the charger has gone out of range of the safety regulation for designing the hardware and the wiring of the charger.

SUMMARY OF THE INVENTION

To improve the charging performance and efficiency, the application provides a method for charging a power device of a portable device and a power device applied with such method.

According to one embodiment of the invention, a method for charging a power device of a portable device using a current-adaptive process is provided. The power device is charged by a charger. The method includes steps: as the charger is charging the power device, detecting a charging voltage and a charging current of the power device and determining whether the charging voltage is above a predetermined voltage value; if the charging voltage is above the predetermined voltage value and the charging current is yet to reach a maximum current value, increasing the charging current an increment amount; if the charging voltage is below the predetermined voltage value, decreasing the charging current the increment amount and charging the power device with the updated charging current; and if the charging voltage is above the predetermined voltage value and the charging current reaches the maximum current value, charging the power device with the charging current.

According to the embodiment of the invention, the method further includes step: setting an initial current value and the charger charging the power device with the initial current value when the charger is connected to the power device.

According to the embodiment of the invention, the step of detecting the charging voltage and the charging current of power device is detecting the charging voltage and the charging current at a charging end of the power device.

According to the embodiment of the invention, the method further includes step: after increasing the charging current the increment amount, stopping detecting the charging voltage and the charging current of the power device for a predetermined period of time.

According to another embodiment of the invention, a power device is provided. The power device includes a charging end, a power storage unit, and a control unit. The charging end is connected to a charger. The power storage unit is utilized for storing power when the charging end is connected to the charger. The control unit is connected between the charging end and the power storage unit. The control unit is utilized for detecting a charging voltage and a charging current, for increasing the charging current an increment amount when the charging voltage is above a predetermined voltage value and the charging current is yet to reach a maximum current value, for decreasing the charging current the increment amount and charging the storage unit with the updated charging current when the charging voltage is below the predetermined voltage value, and for charging the power storage unit with the charging current when the charging voltage is above the predetermined voltage value and the charging current reaches the maximum current value.

According to the embodiment, when the charger is connected to the charging end, the power device is charged with an initial current value by the charger.

According to the embodiment, the initial current value is 1 ampere.

According to the embodiment, the charging voltage and the charging current is detected at the charging end.

According to the embodiment, after increasing the charging current the increment amount, the control unit is further utilized for stopping detecting the charging voltage and the charging current for a predetermined period of time.

According to the embodiment, the increment amount is one of the following: 20 milliampere, 50 milliampere, 100 milliampere, and 200 milliampere.

The method for adjusting the charging current of a power device of a portable device and the power device applied with such method allow the power device to correctly determine a maximum charging current affordable by the charger, in such a way that different chargers may be optimized in charging the power device under a safety concern. Portable devices like the power banks or the tablet computers bundled with power devices that have larger capacity may be well ensured to have optimized charging process to reduce to charging time as much as possible.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
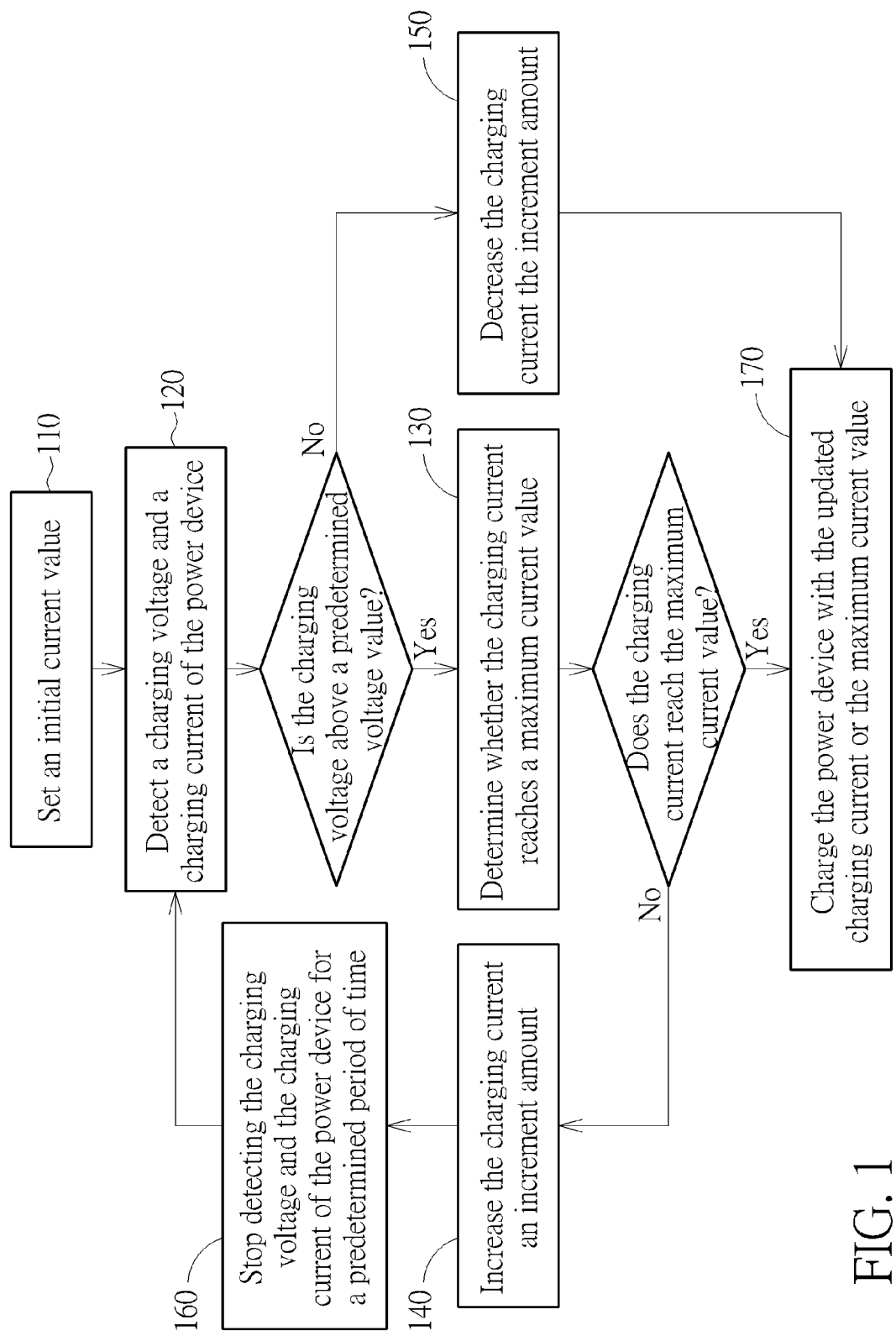
FIG. 1 is a flow chart of a method for charging a power device of a portable device according to the invention.

Please refer to FIG. 1. FIG. 1 is a flow chart of a method for charging a power device of a portable device according to the invention. The portable device may be a notebook computer, a tablet computer, a mobile phone, a smart phone, a wearable device like a smart watch, or a power bank. The method 100 includes steps:

Step 110: set an initial current value on a power device;

Step 120: as a charger is charging the power device, detect a charging voltage and a charging current of the power device and determining whether the charging voltage is above a predetermined voltage value? If yes, perform Step 130; if not, perform Step 150;

Step 130: determine whether the charging current reaches a maximum current value, and perform Step 170 if the charging current reaches the maximum current value; perform Step 140 if the charging current is yet to reach the maximum current value;

Step 140: increase the charging current an increment amount and perform Step 160;

Step 150: when the charging voltage is below the predetermined voltage value, decrease the charging current the increment amount and perform Step 170;

Step 160: stop detecting the charging voltage and the charging current of the power device for a predetermined period of time and then perform Step 120;

Step 170: charge the power device with the updated charging current or the maximum current value.

Figure 2:
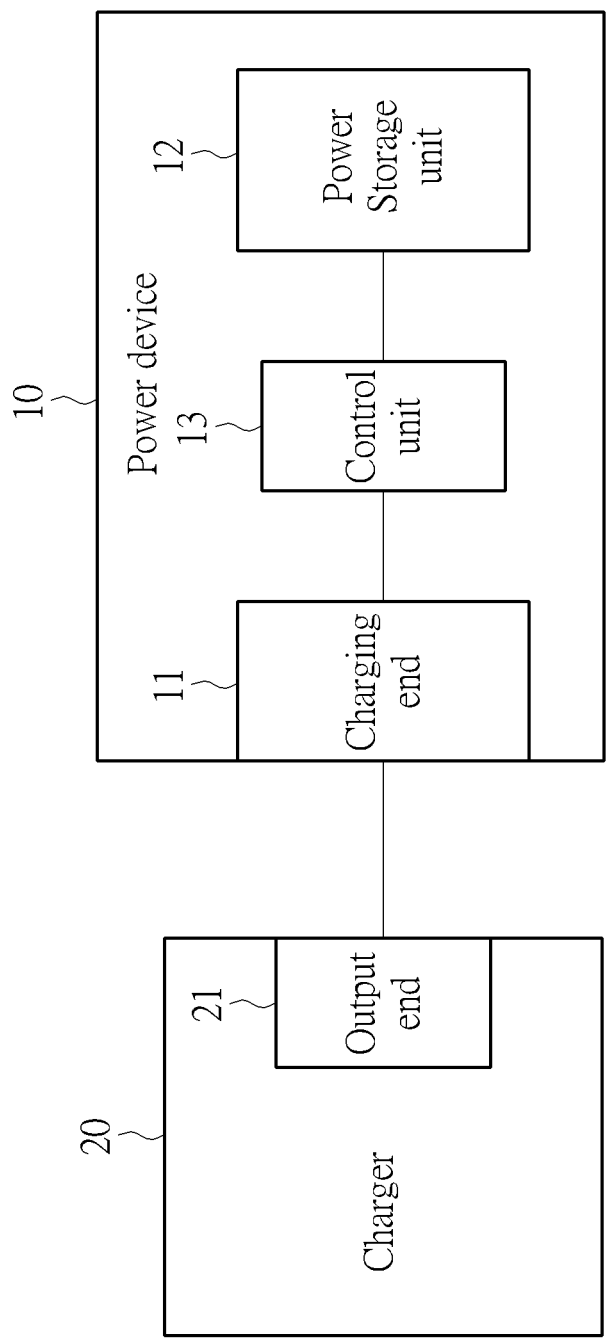
FIG. 2 is an illustration of the power device connected to a charger and applied with the method in FIG. 1.

Please refer to FIG. 2. FIG. 2 is an illustration of the power device connected to a charger and applied with the method in FIG. 1. In FIG. 2, the power device 10 includes a charging end 11, a power storage unit 12, and a control unit 13 connected between the charging end 11 and the power storage unit 12. The charger 20 is connected to the charging end 11 so as to charge the power device 10. The charging end 11 may be implemented as a connector complying with the universal serial bus (USB) regulation, including the USB, the Micro USB or the mini USB connectors. A common charging voltage of the USB connector is 5V±5%, i.e., between 4.75V and 5.25V. Additionally, the charging end 11 may also be implemented with other common interface and have corresponding regulation of charging voltage requirement. The power storage unit 12 is a rechargeable battery that may be selected from one of the following as the storage unit: 18650 battery, li-ion battery, li-polymer battery, etc.

As the charger 20 is connected to the charging end 11 of the power device 10, the power device 10 is charged by the charger 20. The initial current value is set in advance by the control unit 13 or a firmware of the power device 10 and is used as a starting charging current when the power device 10 is connected to the charger 20 for the charging process (Step 110). Whenever the charger 20 is connected to the power device 10, the power device 10 draws current from the charger 20 starting with the initial current value. Referring to the designed current a common charger 20 can afford and the charging current the power device 10 can receive, the initial current value maybe preferably set to 0.5 ampere or 1 ampere (A), and the charging current is then incremented as in Step 140. In other embodiment, the initial current value may also start from 0 A and is incremented in Step 140.

Under the configuration of setting the initial current value by the control unit 13 or the firmware, when the charger 20 is connected to the charging end 11 to charge the power device 10, the control unit 13 takes a real-time detection of a charging voltage and a charging current at the charging end 11, and the charging voltage and the charging current respond the status of voltage and current outputted by the charger 20. It should be noted that, in Step 120, it is at the charging end 11 of the power device 10 where the charging voltage and the charging current are detected, which are not necessarily the same as the voltage and current outputted from an output end 21 of the charger 20. It is because of the fact that resistance exists on the wiring between the charger 20 and the power device 10 and the charger 20 itself. Hence, when making the most of usable current the charger 20 can give, the application makes the determination by the charging voltage and the charging current at the power device 10 side so that the voltage drop caused by wiring and the charger 20 itself may be considered. In Step 120, the control unit 13 determines whether the charging voltage is above a predetermined voltage value? For example, if the charging end 11 is a USB port as described, which is regulated to have charging/discharging voltage falling between 4.75V and 5.25V, it means the charging voltage should be maintained above (or not below) 4.75V at the power device 10 side in such a way to perform the charging process conforming the regulation of USB protocol, and the predetermined voltage value here can be set as 4.75V.

If the charging voltage is detected to fall above the predetermined voltage value, the control unit 13 then determines whether the charging current reaches the maximum current value (Step 130), the maximum charging current. When the power device 10 is at an initial stage of power charging, the charging current is set to be the initial current value as in Step 110, which usually is yet to reach the maximum current value. Then Step 140 is performed to increase the charging current an increment amount, which means the power device 10 is now drawing a larger current from the charger 20. The increment amount is determined by the charge IC, the design of layout of the power device 10 and may be implemented as one of the following: 20 mA, 50 mA, 100 mA, 200 mA, and other value.

Figure 3:
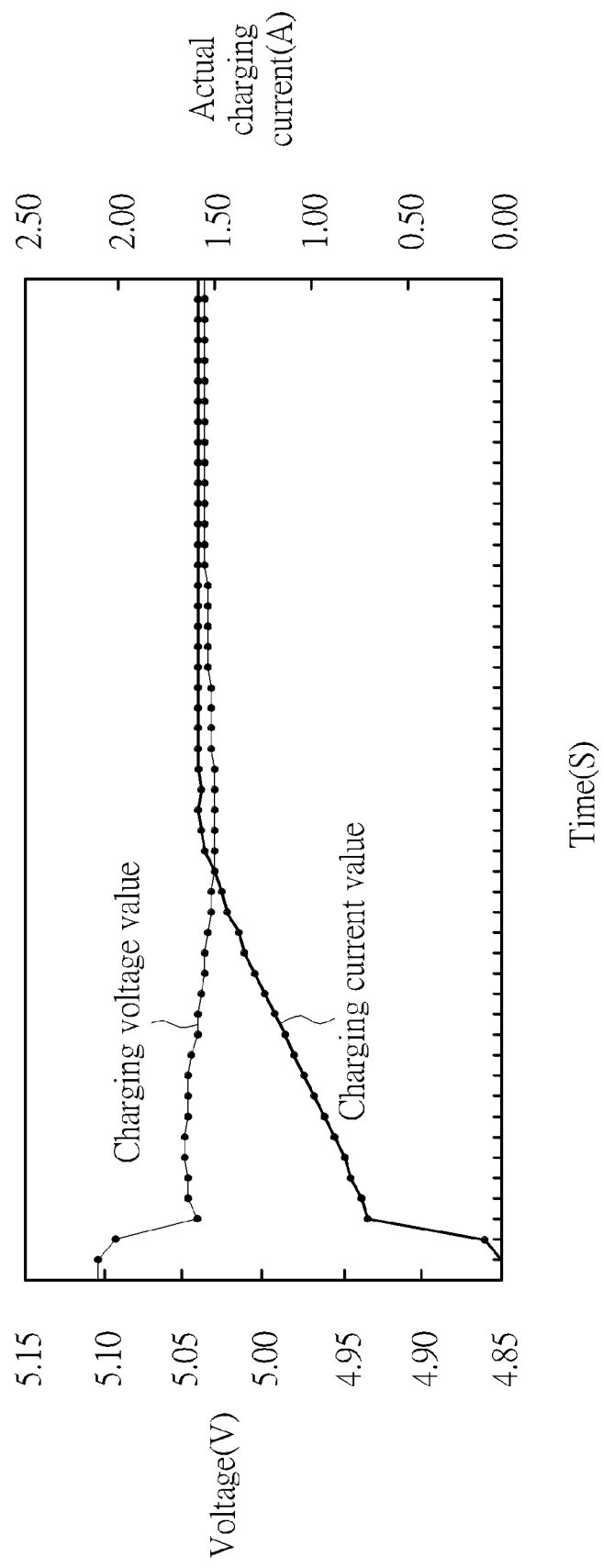
FIG. 3 is a chart showing the charging current and the charging voltage varying with time according to the method of the invention.

Please also refer to FIG. 3, which is a chart showing the charging current and the charging voltage varying with time according to the method of the invention. Given the fact that the charger 20 usually charges a device with constant power, the multiplication of the charging current and the charging voltage is constant. Hence, when the charging current is increased as in Step 140, the charging voltage, corresponding to the supply voltage of the charger 20, drops accordingly, and the control unit 13 also have real-time detection of the change of the charging current and the charging voltage (Step 120). Practically, the current at the charging circuit changes with the voltage and is temporarily unstable. As a result, after increasing the charging current the increment amount (Step 140), the control unit 13 stops detecting the charging voltage and the charging current for a predetermined period of time, such as for a few seconds (Step 160), and goes on to detect the charging current and the charging voltage and performs Step 120.

As the charging current increases incrementally (Step 140) and the charging voltage decreases accordingly, two conditions are going to happen. One is when the charging voltage drops to below the predetermined voltage value. Taking the previous embodiment as an example, when the charging voltage decreases to below 4.75V, which violates the regulation of USB protocol, due to the very step of increasing the charging current in Step 140, the control unit 13 then decreases the charging current back to the status before the last increment amount is added (Step 150). Since the charging current before the last increment amount has a corresponding charging voltage not below the predetermined voltage value, the charging current is considered to be the maximum current value affordable by the charger 20. The latest charging current updated in Step 150 is then taken to charge the power device 10 (Step 170).

The other is when in the process of continuously increasing the charging current as in Step 140, the charging voltage detected by the control unit 13 maintains not below the predetermined voltage value even when the charging current reaches the maximum current value (Step 130). It means that the charger 20 is capable of providing a maximum charging current needed by the power device 10. Hence, the control unit 13 takes the maximum current value as its charging current and draws current from the charger 20 (Step 170).

From the above embodiments, the charging method and the power device provided by the invention utilizes the control unit or firmware of the power device to dynamically detect the status of the charging current and the charging voltage, and by incrementing the charging current, the power device correctly obtains a maximum charging current affordable by a charger without overly drawing the current from the charger that causes overly low charging voltage. Such current-adaptive charging process optimizes the charging process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for charging a power device of a portable device using a current-adaptive process, wherein the power device is charged by a charger and the method comprises steps:
   as the charger is charging the power device, detecting a charging voltage and a charging current of the power device and determining whether the charging voltage is above a predetermined voltage value;
   if the charging voltage is above the predetermined voltage value and the charging current is yet to reach a maximum current value, increasing the charging current an increment amount;
   if the charging voltage is below the predetermined voltage value, decreasing the charging current the increment amount and charging the power device with the updated charging current; and
   if the charging voltage is above the predetermined voltage value and the charging current reaches the maximum current value, charging the power device with the charging current.

2. The method of claim 1, further comprising step: setting an initial current value and the charger charging the power device with the initial current value when the charger is connected to the power device.

3. The method of claim 1, wherein detecting the charging voltage and the charging current of power device is detecting the charging voltage and the charging current at a charging end of the power device.

4. The method of claim 1, further comprising step: after increasing the charging current the increment amount, stopping detecting the charging voltage and the charging current of the power device for a predetermined period of time.

5. A power device, comprising:
   a charging end for being connected to a charger;
   a power storage unit for storing power when the charging end is connected to the charger; and
   a control unit, connected between the charging end and the power storage unit, the control unit utilized for detecting a charging voltage and a charging current, for increasing the charging current an increment amount when the charging voltage is above a predetermined voltage value and the charging current is yet to reach a maximum current value, for decreasing the charging current the increment amount and charging the storage unit with the updated charging current when the charging voltage is below the predetermined voltage value, and for charging the power storage unit with the charging current when the charging voltage is above the predetermined voltage value and the charging current reaches the maximum current value.

6. The power device of claim 5, wherein when the charger is connected to the charging end, the power device is charged with an initial current value by the charger.

7. The power device of claim 6, wherein the initial current value is 1 ampere.

8. The power device of claim 5, wherein the charging voltage and the charging current is detected at the charging end.

9. The power device of claim 5, wherein after increasing the charging current the increment amount, the control unit is further utilized for stopping detecting the charging voltage and the charging current for a predetermined period of time.

10. The power device of claim 5, wherein the increment amount is one of the following: 20 milliampere, 50 milliampere, 100 milliampere, and 200 milliampere.

* * * * *